Figures 1, 2:
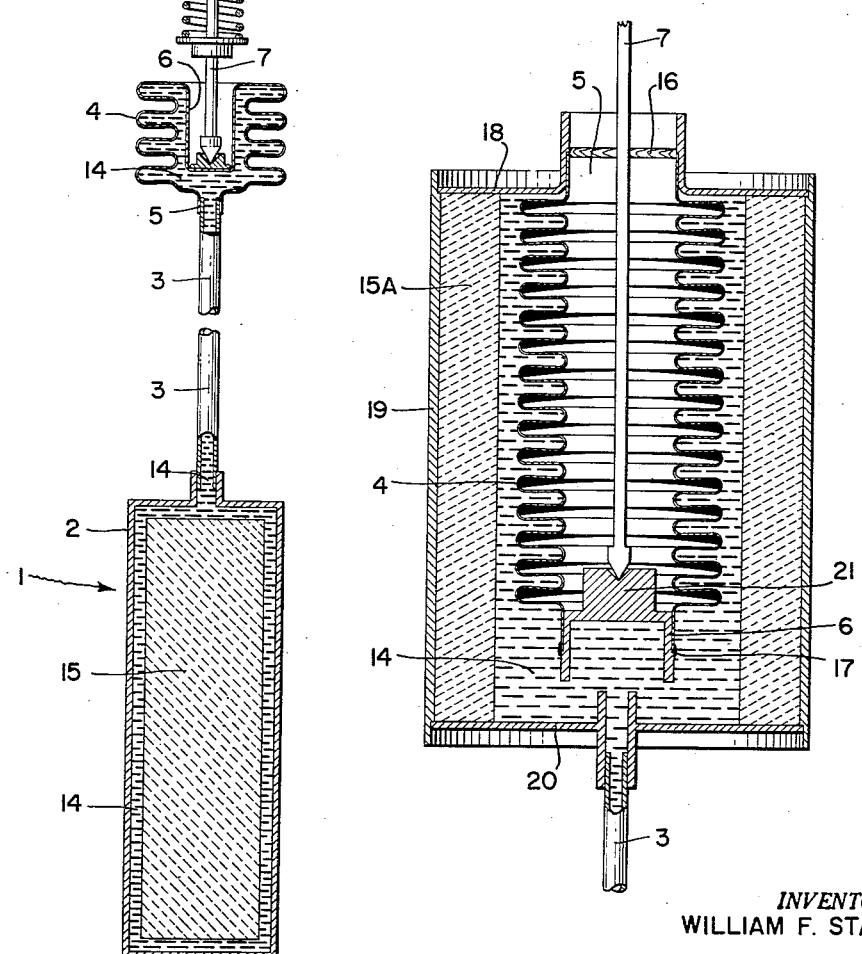

May 27, 1958 W. F. STAHL 2,836,367
CONTROLLER
Filed Dec. 6, 1955

INVENTOR.
WILLIAM F. STAHL
BY
Arthur H. Swanson
ATTORNEY.

2,836,367

CONTROLLER

William F. Stahl, Elkins Park, Pa., assignor to Minneapolis-Honeywell Regulator Company, Minneapolis, Minn., a corporation of Delaware Application December 6, 1955, Serial No. 551,283

4 Claims. (Cl. 236—98)

This invention relates to a temperature-responsive indicator or controller arranged to move to safe position whenever the temperature-responsive element fails.

It is an object of this invention to provide a temperature-responsive, liquid-filled indicator or controller having a decrease in internal pressure upon an increase in heat applied thereto due to an element.

It is a more specific object of this invention to provide a temperature-responsive, mercury-filled controller or thermometer comprising a case having a rigid part and a movable part, mercury or other expansible liquid enclosed within said case, an indicating or controlling element actuated by said movable part, and a spring biasing said element to safe position. In this indicator or controller there is enclosed within said case a body of material having a negative coefficient of thermal expansion. These parts are so arranged that an increase in heat applied to said case causes a decrease in the internal pressure applied to said movable part.

Another object of this invention is to provide a power-transmitting, liquid-filled device having compensation against changes due to ambient temperature.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a diagrammatic or schematic view showing the parts in longitudinal cross section; and Fig. 2 is a longitudinal cross section of a modification.

A liquid-filled thermometer or temperature-responsive controller comprises a relatively rigid case, generally indicated at 1. Case 1 comprises a temperature-responsive, metallic bulb 2; a metallic, capillary tube 3 which has a bore of small diameter through it; and a movable element, all connected to each other in series. This movable element is shown as comprising a bellows 4 of flexible metal having a stationary end 5 and a movable end 6.

The final control element of the controller is shown as comprising a valve having an actuating element 7 abutting the movable end 6 of the bellows 4. Actuating element 7 comprises a valve stem having a movable valve element 8 mounted on it. Movable valve element 8 cooperates with a stationary valve seat 9 located between the inlet chamber 10 and the outlet chamber 11 so as to control the flow of fluid between the two chambers. Between the outside of the valve casing 12 and the actuating element 7 is located a spring 13 which biases the movable valve element 8 to closed position.

The case 1 (comprising the bulb 2, the capillary 3, and the bellows or movable element 4) is completely filled with a liquid which expands when its temperature is raised. Mercury is a suitable example of such a liquid although many others including water may be used.

Within bulb 2 is located a cylindrical body of a ceramic such as a lithium alumino-silicate compound. Such a ceramic is made by the Stupakoff Ceramic and Manufacturing Company, Latrobe, Pennsylvania, under the trademark "Stupalith." Such ceramics may be made so as to have a coefficient of thermal expansion which is nearly zero or negative. For the purposes of this invention, however, there is employed a ceramic of this type having a negative coefficient of thermal expansion. The lowest coefficient of thermal expansion in this series is $-6.5$ times $10^{-6}$ and the highest coefficient of thermal expansion is $2.0$ times $10^{-6}$.

The bulb 2 is located at a place whose temperature is to be measured or at which the control of the controller is to be exercised. If the temperature to which bulb 2 is exposed rises, the liquid 14 will expand. However, since the body 15 or ceramic has a negative coefficient of thermal expansion and since the decrease in volume of the body 15 is greater than the increase in volume of the case 1 and of the liquid 14, when the bulb 2 is heated, the bellows 4 contracts under the stress or bias of spring 13 because the increase in volume of the case and of the liquid act in opposite directions to cause a net increase in internal pressure while the decrease in volume of the body counteracts the increase in volume of the case and of the liquid and causes an over-all decrease in internal pressure. This causes the valve 8 to move to the safe position in which the movable valve element 8 engages the valve seat 9 and closes communication between the chambers 10 and 11. Thus it will be seen that if the case 1 leaks or if the liquid 14 escapes for any reason the spring 13 will cause the controller to assume a safe position in which the valve is closed. If the temperature to which bulb 2 is exposed falls, a series of operations takes place which is the reverse of that just described.

Fig. 2 shows a modified form having compensation for ambient temperature. The movable element in which the bellows 4 is closed within a cup 19 has dished ends 18 and 20. The stationary end 5 of bellows 4 is secured to the dished end 18 by a seam weld 16. The movable end 6 of bellows 4 is secured to a movable bellows element 21 by a seam weld 17. Within cup 19 is located a tubular body 15A of material having a negative coefficient of thermal expansion.

If the temperature surrounding cup 19 increases, the volume of cup 19 expands, the volume of body 15A contracts, and the volume of liquid 14 expands. These changes in volume are so proportional to one another that there is no change in the internal pressure which the liquid exerts on the movable element and therefore no change in the output motion of actuating element 7.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. Means for compensating a thermometer for changes in ambient temperature, including, a relatively rigid, hollow bulb; a capillary tube communicating with the interior of said bulb; a cylinder communicating at its interior with said capillary tube; a bellows forming a relatively movable wall of said cylinders; mercury filling said bulb and said tube and said cylinder and said bellows; said bulb, said tube, said cylinder, said bellows, and said mercury each having a positive coefficient of expansion when heated; and a body of material having a negative coefficient of expansion when heated and enclosed in said cylinder adjacent said bellows, the changes in volume of said body, when heated, being adapted to compensate for the changes in volume of said bulb, said tube, said cylinder, and said bellows when heated.

2. A temperature-responsive controller arranged to move to safe position whenever the temperature-responsive element fails, including: a metal case; a metal bellows forming part of said case; a body of material having a negative coefficient of expansion, when heated, and enclosed within said case; mercury completely filling the space between said case and said body and engaging one surface of said bellows; the changes in volume of said body, when heated, being greater than the net change in volume caused by the expansion of said case and of said mercury, when heated, said changes being opposite in direction, whereby said bellows is caused to move in one direction when said mercury and said body are heated and to move in the opposite direction when said liquid and said body are cooled; a spring biasing said bellows in said one direction; and a valve actuated by the difference between the pressure exerted by said bellows and the pressure exerted by said spring and biased to closed position by said spring.

3. A temperature-responsive controller arranged to move to safe position whenever the temperature-responsive element fails and compensated for changes in ambient temperature, said controller including: a metal case; a metal bellows forming part of said case; said case and said bellows each having a positive coefficient of thermal expansion; a ceramic body of lithium alumino-silicate compound having a negative coefficient of thermal expansion, when heated, and enclosed within said case; mercury completely filling the space between said case and said body and engaging one surface of said bellows; the changes in volume of said body, when heated, being greater than the net change in volume caused by the expansion of said case and of said mercury, when heated, said changes being opposite in direction, whereby said bellows is caused to move to safe position when said mercury and said body are heated and to move in the opposite direction when said liquid and said body are cooled; a spring biasing said bellows towards safe position; and a valve actuated by the difference between the pressure exerted by said bellows and the pressure exerted by said spring and biased towards safe position by said spring.

4. A temperature-responsive controller arranged to move to safe position whenever the temperature-responsive element fails, including: a relatively rigid case having a relatively movable element forming a part thereof; a liquid having positive coefficient of expansion when heated and completely enclosed within said rigid case and said movable element; a body of material having a negative coefficient of expansion, when heated, and completely enclosed within said rigid case and said movable element, the changes in volume of said body, when heated, being greater than the net change in volume caused by the expansion of said rigid case and of said movable element and of said liquid, when heated, said changes being opposite in direction, whereby said movable element is caused to move in one direction when said liquid and said body are heated and to move in the opposite direction when said liquid and said body are cooled, a spring biasing said movable element in said one direction, and a final control element actuated by the difference between the pressure exerted by said movable element and the pressure exerted by said spring and biased to safe position by said spring.

References Cited in the file of this patent

UNITED STATES PATENTS

| 938,548 | Brady | Nov. 2, 1909 |
| 960,860 | Enterline | June 7, 1910 |
| 1,059,197 | Mustee | Apr. 15, 1913 |
| 1,784,734 | Lawler | Dec. 9, 1930 |
| 1,920,458 | Bost | Aug. 1, 1933 |
| 1,995,385 | Foote | Mar. 26, 1935 |
| 2,037,949 | Tate | Apr. 21, 1936 |
| 2,392,613 | Persons | Jan. 8, 1946 |

FOREIGN PATENTS

| 526,378 | France | June 30, 1921 |